US005820120A

United States Patent [19]

[11] Patent Number: 5,820,120

[45] Date of Patent: Oct. 13, 1998

Anderson

[54] CRADLE SYSTEM REPAIR OF MODEL RAILROAD TRAINS

[76] Inventor: Charles W. Anderson, P.O. Box 1148, Chino Valley, Ariz. 86323

[21] Appl. No.: 657,091

[22] Filed: Jun. 3, 1996

[51] Int. Cl.[6] .......... B23Q 3/02

[52] U.S. Cl. .......... 269/99; 269/285; 269/286; 269/287; 269/289 R; 269/909; 202/4.33; 202/4.34

[58] Field of Search .......... 220/4.33, 4.34; 206/523; 269/99, 287, 289 R, 285, 286, 909; 29/281.1

[56] References Cited

U.S. PATENT DOCUMENTS

| | | | |
|---|---|---|---|
| 3,563,578 | 2/1971 | Meller | 220/4.34 |
| 3,884,380 | 5/1975 | Prochnow et al. | 206/523 |
| 4,445,678 | 5/1984 | George | 269/99 |
| 5,040,678 | 8/1991 | Lenmark et al. | 206/523 |
| 5,577,440 | 11/1996 | Marie | 220/4.33 |

*Primary Examiner*—Robert C. Watson
*Attorney, Agent, or Firm*—Martin L. Stoneman

[57] ABSTRACT

This invention provides a portable system for adjustably grasping and cradling a model train engine or other car (especially Garden Scale) without damaging it and presenting the desired portion of such engine or car for repair or maintenance. The device used includes: a rectangular longitudinal plywood base plate having in its upper surface a pair of transverse upside-down T-slots with sloppy-fit nut members captured in the T-slots; and a pair of longitudinal plywood vertical side plates, each fitted with vertical bolt members tightenable in the corresponding nut members. When the piece to be worked on is placed between the side plates, with appropriate cushioning, the sloppy fits permit the side plates to be pushed into snug position before tightening. The device also provides a cover with a handle for portability between uses.

4 Claims, 2 Drawing Sheets

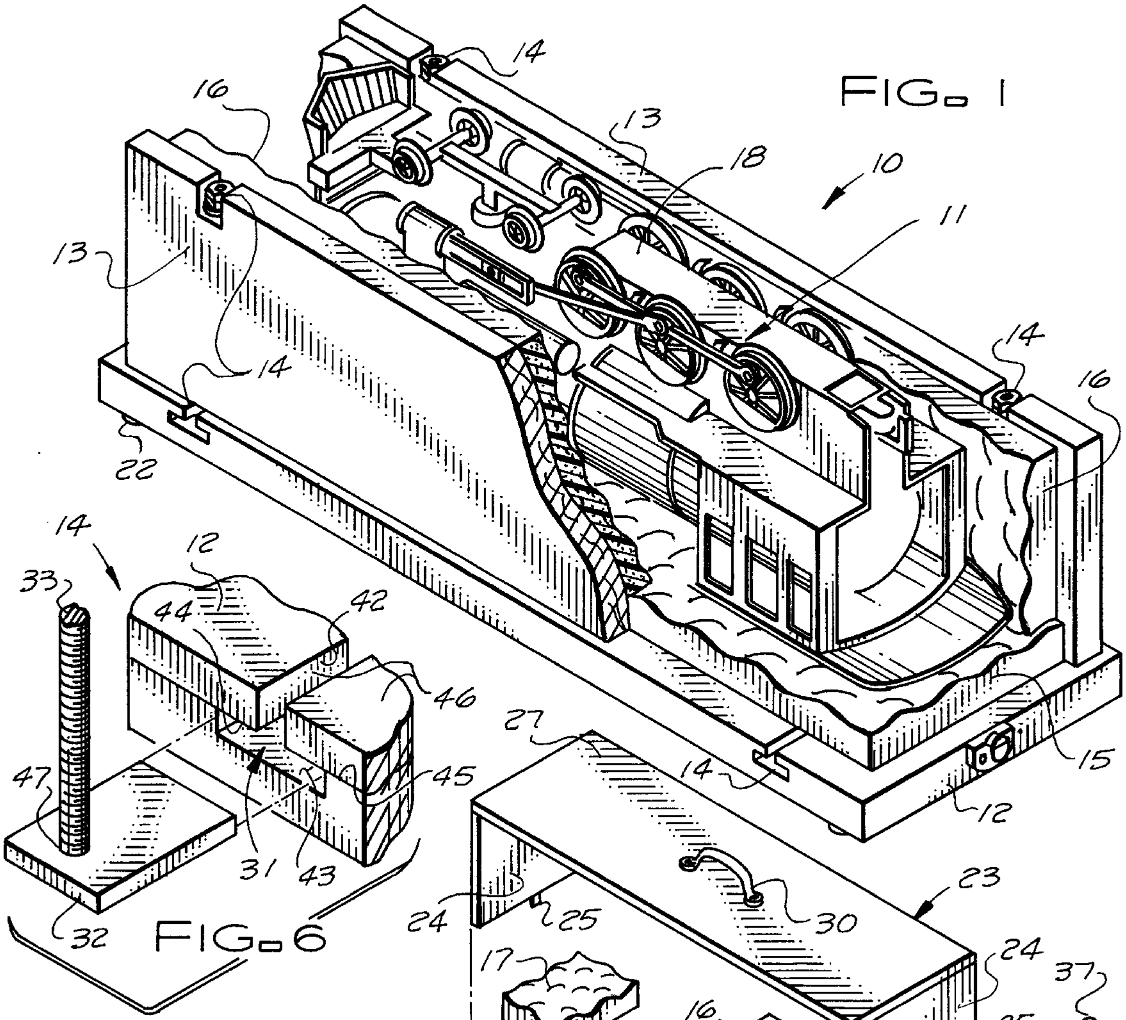
FIG. 1
FIG. 6
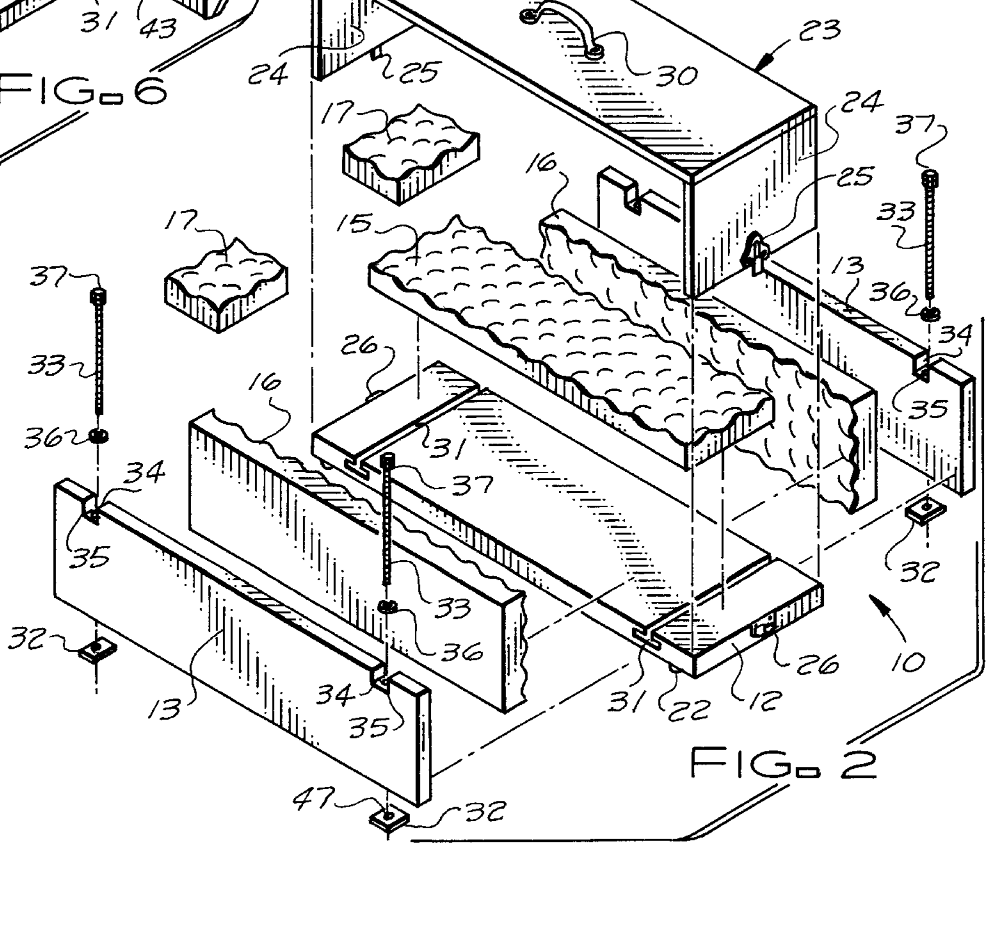
FIG. 2

FIG. 4
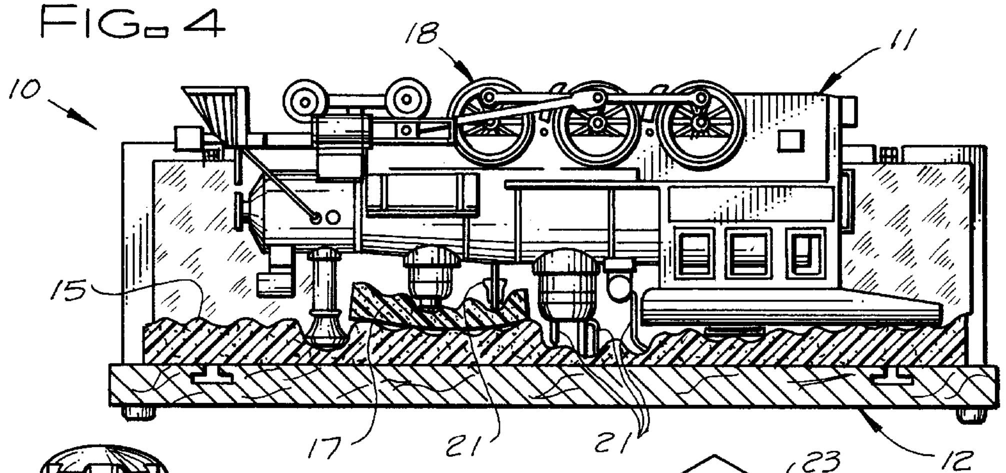
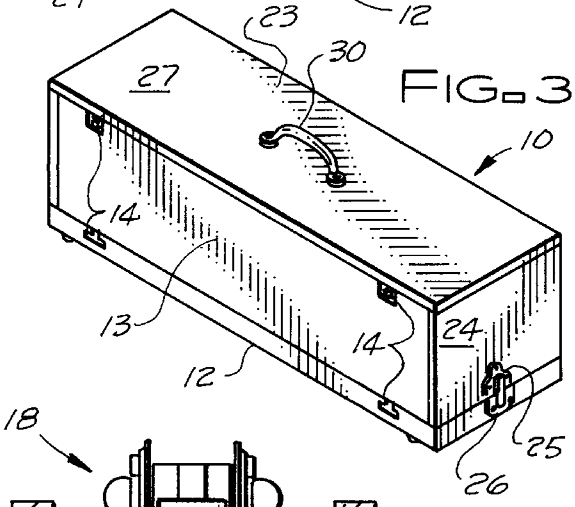
FIG. 3
FIG. 8
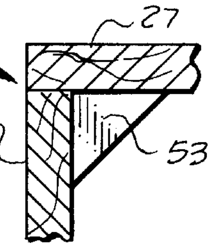
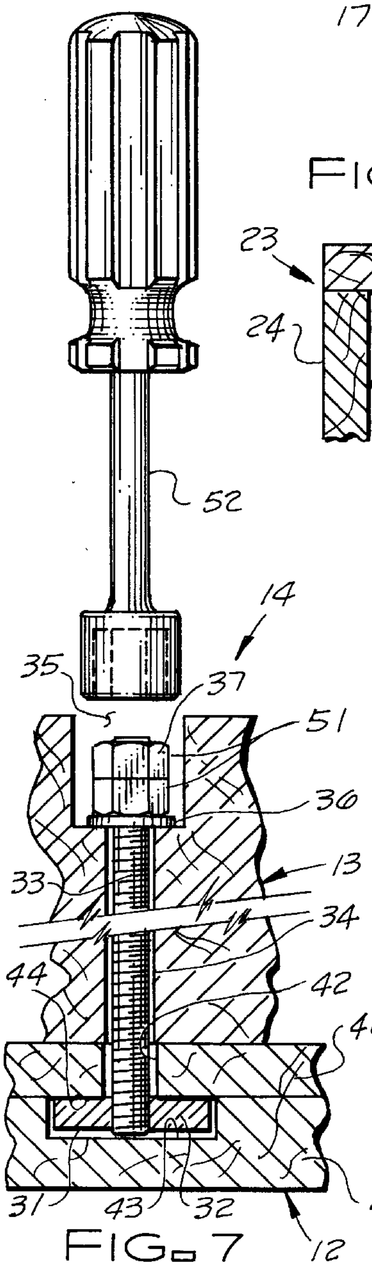
FIG. 7
FIG. 5
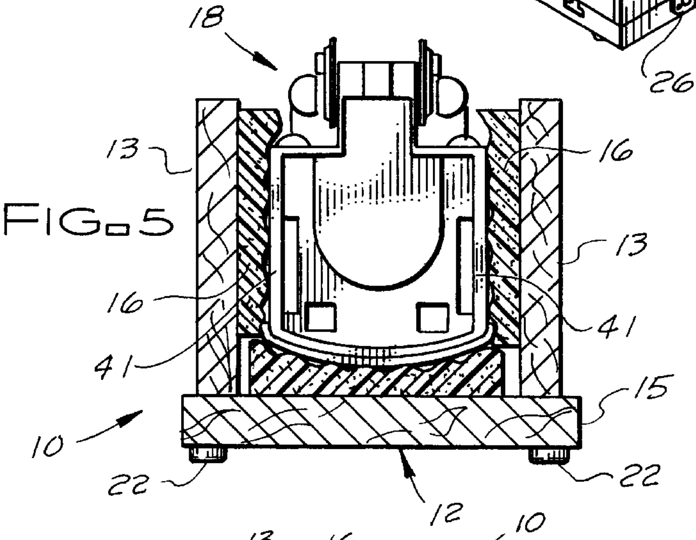
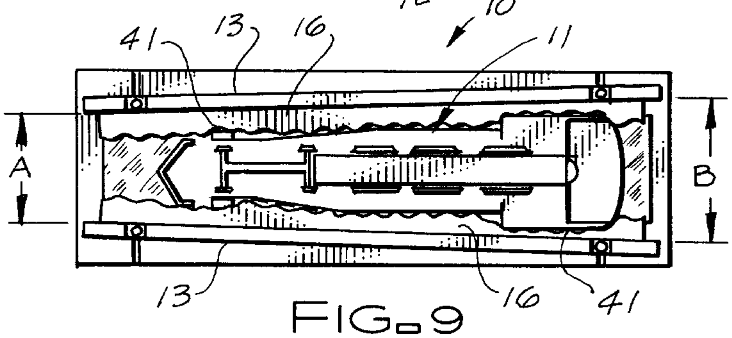
FIG. 9

CRADLE SYSTEM REPAIR OF MODEL RAILROAD TRAINS

BACKGROUND OF THE INVENTION

1. Field of the Invention

This invention relates to providing an improved system for cradling, i.e., firmly holding or supporting, model railroad engines and cars while they are being repaired or maintained. More particularly, this invention concerns a system for adjustably grasping and cradling a model railroad engine or car without damaging such rolling stock and presenting the desired portion of such engine or car available for repair or maintenance. Even more particularly, this invention concerns such a system which is portable for outdoors use with Garden Scale model trains.

2. Description of the Prior Art

Model railroading enthusiasts are frequently working on the rolling stock of their model railroads. Whether initially building and assembling the railroad to place it in operation or later routine maintenance, repair or modification, the model engines and cars are frequently being worked on. The intricacy and precision of these engines and cars require not only the skill of the repair person and the availability of an assortment of suitable tools, but also upon free usage of the hands of the repair person. The engine or car being worked is usually required to be held in a steady and stable manner so that the work may be performed. The ordinary intricacy and complexity of the exterior detail of these engines and cars and their vulnerability to paint scratches and other damage makes them particularly difficult to grasp and solidly hold in a manner and orientation that will make them available to be worked on. Also, the majority of the mechanical components are on the underside, and to work on, repair and maintain such engines and cars, they need to be held in an inverted position. This is difficult to do without causing undue damage.

It is especially difficult to make on-the-spot repairs to Garden Scale model trains in that they are ordinarily run outdoors in attractive places, usually away from access to shops or other indoor repair facilities. For on-the-spot repair or maintenance of such Garden Scale model train cars, it is common to cushion and protect the vulnerable detailed portions of the engine or car with towels, pillows, or the like, and then attempt to firmly cradle personally the engine or car in a steady manner so that the desired work may be performed. Frequently this results in either the need of the help of another person or holding the engine or car cradled on the lap or grasped between the legs. This inconvenience is multiplied with rolling stock of larger size. Garden Scale model railroading is a large $1/20.5$ scale size; and a typical engine may weigh as much as 5 to 20 pounds. With this large size, vulnerable detailing and inconvenient shapes present an even greater challenge in firmly cradling an engine or car so that it may be worked on. O-Scale model railroading, although a smaller $1/32$ scale, still presents a similar challenge.

OBJECTS OF THE INVENTION

A primary object of the present invention is to fulfill the above-mentioned needs by the provision of a cradling system whereby a model railroad engine or car may be conveniently and safely held in a manner where it is available to be worked on. A further primary object of the present invention is to provide such a system which is efficient, inexpensive, and handy. In addition, it is a primary object of this invention to provide such a system for use in connection with Garden Scale railroads of the type which are used in large out-of-doors layouts and which call for a portable cradling system. Other objects of this invention will become apparent with reference to the following invention descriptions.

SUMMARY OF THE INVENTION

According to a preferred embodiment of the present invention, this invention provides a portable cradle system for use in repairing model train rolling stock, comprising, in combination: longitudinal base plate means having a horizontal upper surface and a pair of end vertical transverse surfaces, such base plate means comprising a transverse upside-down T-slot in such upper surface, such T-slot having an upper portion narrower than a bottom portion of such T-slot; longitudinal vertical side plate means abutting such upper surface of such base plate means and having upper edges, such side plate means defining an interior work space and comprising a vertical hole aligned with a such T-slot; connection means for releasably connecting such base plate means with such side plate means, such connection means comprising bolt means passing through such vertical hole, nut means situate in such T-slot, such bolt means being tightenable in such nut means, whereby such side plate means may be immovably connected with such base plate means.

Further, this invention provides such a portable cradle system further comprising cushioning means in such interior work space and abutting such side plate means; and, further, wherein such cushioning means comprises a resilient sheet material having a shallow egg crate patterned surface. It also provides such a portable cradle system further comprising a longitudinal cover means for abutting such upper edges of such side plate means, such cover means being connected to transverse end means for attaching such cover means to such base plate in such manner that such interior work space is fully enclosed. Additionally, this invention provides such a portable cradle system further comprising: a latching means for releasably latching such end means to such base plate; and handle means for assisting in the carrying of such portable cradle system, connected to such cover means. It also provides such a portable cradle system wherein such connection between such cover means and such end means comprises a reinforcement having a right triangle cross-section. And it provides such a portable cradle system wherein such nut is generally rectangular and is sized small enough to permit movement through a such bottom portion of a such T-slot; and, further, wherein such bottom portion of such T-slot is about $1\frac{1}{16}$ inches wide and such nut is about one inch wide; and, further, wherein such nut is about $\frac{1}{4}$ inch deep, about one inch wide and about $1\frac{1}{2}$ inches long.

Moreover, the present invention provides such a portable cradle system wherein: such bolt means comprises bolt-head means, below a level of such upper edges, for tightening and loosening such bolt means from above; and such side plate means comprises notch means, along such upper edges and in line with such vertical hole, for permitting such bolt-head means to be tightened and loosened from above. It also provides such a portable cradle system wherein: such nut is generally rectangular and is sized small enough to permit movement through a such bottom portion of a such T-slot; and such cradle system further comprises cushioning means in such interior work space and abutting such side plate means. And it provides such a portable cradle system, for use with model trains of about Garden Scale size, wherein such interior work space is about (on average) 6 to 7 inches wide, about 6 inches high, and about 2 feet long; and, also, further comprising, cradled in such interior work space in such cushioning means, a piece of model train rolling stock.

Still further, according to a preferred embodiment thereof, this invention provides a portable cradle system for use in repairing model train rolling stock, comprising, in combination: a flat rectangular longitudinal base plate having an upper surface; a pair of transverse upside-down T-slots in such upper surface, each such T-slot having an upper portion narrower than a bottom portion of such T-slot; a pair of longitudinal vertical side plates abutting such upper surface of such base plate and having upper edges, a location of such pair of side plates defining an interior work space having adjustable widths; a pair of vertical holes in each such side plate, each such hole being aligned over a such T-slot; a bolt passing through each such vertical hole; a rectangular nut situate in and in sloppy fit with each such T-slot; each such bolt being tightenable with a corresponding such nut, whereby each such side plate may be releasably immovably connected with such base plate at a such location.

In addition, this invention provides such a portable cradle system further comprising: cushioning means in such interior work space and abutting such side plates and base plate; and, cradled in such interior work space in such cushioning means, an upside down piece of model train rolling stock. And it provides such a portable cradle system further comprising: a longitudinal cover constructed and arranged for abutting such upper edges of such side plates, such cover further comprising a pair of transverse ends for attaching such cover to such base plate in such manner that such interior work space is fully enclosed; and a latch on each such end for releasably latching each such end to such base plate. Also, it provides such a portable cradle system wherein such interior work space is about (on average) 6 to 7 inches wide, about 6 inches high, and about 2 feet long.

Yet additionally, according to a preferred embodiment thereof, this invention provides a portable cradle system comprising the steps of: providing a first flat rectangular plywood sheet having a pair of ends and an upper surface; providing four identical rectangular metal nuts and four corresponding fitting identical bolts each about 6 inches long; near each such end, cutting a large transverse notch into such upper surface, such large transverse notch being about 1/16 inch wider than the width of a such nut and 1/16 inch deeper than the height of a such nut; providing a second flat rectangular plywood sheet having a lower surface and having the same length and width as such first flat rectangular plywood sheet; superimposing and adhesively fixing such lower surface of such second plywood sheet upon such upper surface of such first plywood sheet; and, centered on each such large transverse notch, cutting a small transverse notch through such second plywood sheet, the width of such notch being about 1/16 inch more than the diameter of a such bolt.

Even further, this invention provides such a portable cradle system further comprising the steps of: providing a pair of third flat rectangular plywood sheets; aligning each such third plywood sheet vertically atop a corresponding longitudinal edge of such second plywood sheet; in each such third plywood sheet, drilling a pair of vertical bolt-holes, each such vertical bolt-hole being centered on a such small transverse notch; placing a pair of such nuts in each such large transverse notch, a such nut under each such vertical bolt-hole; in each such third plywood sheet, cutting a top notch, through such third plywood sheet, large enough to permit a bolt-head manipulation from above; and placing a such bolt in each such bolt-hole and loosely affixing each such bolt in each such corresponding nut. And it provides such a portable cradle system further comprising the steps of: by sliding such third plywood sheets along such second plywood sheet, cradling a model train rolling stock piece, of about Garden Scale, within cushioning members, until such piece is safely snug enough for repair; and tightening each such bolt in each such corresponding nut for secure cradling.

BRIEF DESCRIPTION OF THE DRAWINGS

FIG. 1 is a perspective view, with a partial cut away, of a cradle, for the repair of model trains, according to a preferred embodiment of the present invention, shown holding a model train engine.

FIG. 2 is a perspective exploded view of the cradle.

FIG. 3 is a perspective view of a cradle and its cover.

FIG. 4 is a longitudinal cross-section elevation view of a cradle with a model train engine.

FIG. 5 is a cross-section elevation view of a cradle with a model train engine.

FIG. 6 is a perspective detail view of the T-slot and nut plate of a preferred embodiment of the present invention.

FIG. 7 is a cross-section elevation view of the side holding means.

FIG. 8 is a cross-section elevation view of the cover corner construction.

FIG. 9 is a plan view of a cradle with a model train engine.

DETAILED DESCRIPTION OF A PREFERRED EMBODIMENT AND THE BEST MODE OF PRACTICE

Illustrated in perspective in FIG. 1, is a cradle 10, shown with a partial cut away for clarity, holding an engine 11 of a model train. The cradle 10 is comprised of longitudinal base plate means embodied by base plate 12; longitudinal vertical side plate means embodied by the pair of side plates 13, which are identical and movable; connection means for releasably connecting base plate 12 with said side plates 13, embodied by connection 14; and cushioning means embodied by base cushion 15, two side cushions 16, and spacer cushions 17 (which are not illustrated in FIG. 1). Additionally, the cradle 10 incorporates longitudinal cover means embodied by cover 23 (not shown in FIG. 1) which is not used while the cradle 10 is in use; the cover 23 is illustrated in FIGS. 2 and 3.

The engine 11 is cushioned by the base cushion 15 and a side cushion 16 on either side, and is gently yet firmly grasped and supported by these cushions. The side plates 13, by appropriate positioning as later herein described, apply appropriate pressure to the side cushions 16 for this cradling action. As illustrated, the engine 11 is usually being held by the cradle 10 in an inverted manner, presenting the bottom portion 18 of the engine 11 available for the work which is to be performed on it. In this case, the engine 11 is also resting upon the base cushion 15, but if greater accessibility to the engine 11 is needed, the engine 11 may be positioned higher within the cradle 10, not resting upon the base cushion 15, yet amply grasped by the side cushions 16. This would be more common with shorter rolling stock, such as a flat bed car. Additional smaller spacer cushions 17 (not shown) may be strategically located on the base cushion 15 to offer a greater elevated or enhanced contour for support of irregularly shaped engines 11 or cars. The base cushion 15, side cushion 16, and spacer cushions 17 are preferably composed of synthetic foam with the engaging surface 20 shaped in a shallow egg crate pattern. The base cushion 15, side cushions 16 and spacer cushions 17 are of ample thickness and softness to conform to the irregular exterior shape of the engine 11 or car, while gently protecting any delicate protruding details 21, yet providing overall required support.

The side plates 13 may be adjustably positioned inwardly, pressing the side cushions 16 against the engine 11 (or a car of the train), the amount needed to hold such engine 11, or car, firmly in place. Once the side plates 13 are appropriately positioned, they are rigidly secured in place, to the base plate 12 using the connections 14. The base plate 12, both side plates 13 and the cover (not shown) are preferably constructed of wood, more particularly plywood. There are four small rubber feet 22 attached to the underside of the base plate 12, one near each corner. These rubber feet 22 protect any surface on which the cradle 10 is resting and may prevent the cradle 10 from sliding when such engine 11, or car, is being worked on.

An exploded view of the cradle 10 is shown in perspective in FIG. 2. The shallow-egg-crate-patterned-foam base cushion 15, side cushions 16, and spacer cushions 17 are loose items and are stored within the cradle 10 and retained by the cover 23 when the cradle 10 is not in use. Transverse end means embodied by the end panels 24 of the cover 23 incorporate latch first halves 25 for engaging with latch second halves 26 for securing the base plate 12 to the cover 23 when the cradle 10 is not in use, thereby embodying the latching means of the present invention. The top panel 27 of the cover 23 incorporates handle means embodied by a handle 30, centrally located for balanced carrying of the cradle 10. A detail of a preferred method of joining of the end panels 24 to the top panel 27 is shown in FIG. 8.

The connection 14 incorporates two T-slots 31, each running crossway (i.e., transversely) near opposing ends of the base plate 12 for accepting a nut plate 32 and bolt 33 at each end of each side 13. A hole 34 is drilled through each end of the side plates 13 for a bolt 33 along with a recess or notch 35 for a flat washer 36 and the bolt head 37. When the bolts 33 of the side plates 13 are loosened, the side plates 13 may be moved inwardly or outwardly as desired, yet remain attached to the base plate 12. When the bolts 33 are tightened, the side plates 13 are secured tightly to the base plate 12.

In FIG. 3 the cradle 10 with its cover 23 attached is shown. To prepare the cradle 10 for carrying as shown, the connection 14 of the side plates 13 would be tightened, and with the foam cushions inside, the cover 23 would be attached to the base plate 12 with the securing of the latch first halves 25 to the latch second halves 26.

A longitudinal cross-section elevation view of a cradle 10 with an engine 11 contained is illustrated in FIG. 4. The bottom portion 18 of the inverted engine 11 is extending upward out of the cradle 10. This bottom portion 18 is generally the portion of the engine 11, or the car, that contains the majority of the mechanisms and mechanical and electrical components that require periodic maintenance and repair. And the sides and top of the engine 11, or the car, generally contain decorative surfaces and delicate protruding details 21 which are easily broken or damaged. The base cushion 15 is shown supporting the engine 11, yet at the same time gently conforming to the shape of the delicate protruding details 21 without exerting undue pressure on them. If desired, additional support may be provide for the engine 11, or car, by strategic placement of spacer cushions 17.

The inward pressure of the side plates 13 on the side cushions 16 and the resultant clamping pressure on the engine 11, or car, is adjusted by the positioning of the side plates 13 before they are immovably tightened in place to the base plate 12. As shown in FIG. 5, an engine 11 with sides 41 that are substantial may allow for a tight grip by the side cushions 16. The bottom portion 18 of the engine 11 is shown in a favorable position for servicing. If it is advantageous to work on the bottom portion 18 while it is orientated on its side, the cradle 10 may be tipped on its side while still offering firm, protected holding of the engine 11. While being used in an upright position the cradle 10 rests on its rubber feet 22.

To provide an adjustable, rigid attachment of side plates 13 to the base plate 12, the connection 14 is provided as shown in detail in FIGS. 6 and 7. As previously shown in FIG. 2, two T-slots 31 extend the full width of the base plate 12, perpendicular to the longitudinal dimension and near each end of the base plate 12. The T-slot 31 is comprised of a bolt slot 42 and a nut plate relief 43 with a clamp surface 44. To provide for T-slot 31 of improved quality and simplified construction, the base plate 12 is fabricated from a lower plywood portion 45, which is preferably a sheet of ¾ inch thickness, and an upper plywood 46 portion, preferably a sheet of ⅜ inches thickness with length and width matching the lower plywood 45 portion. The order and method of construction is as follows:

A nut plate relief or notch 43 is milled into the lower plywood 45 at the required location. The upper plywood 46 is glued atop the lower plywood 45 using a suitable wood glue. A bolt slot 42 is milled through the upper plywood 46, centered above and parallel to the nut plate relief 43. This resulting T-slot 31 results in a clamp surface 44 which is the bottom surface of the upper plywood portion 46.

The nut plate 32 is preferably steel, rectangular in shape, preferably with dimensions of 1"×1½" and ¼" in thickness. Centered on the nut plate 32, near one end is a through-hole 47, tapped ¼–28 N.F. thread, for accepting bolt 33. The clearance between the dimensions of the nut plate 32, the bolt 33 and the T-slot 31 is such that the T-slot 31 is approximately 1⁄32" larger all around. This clearance allows for greater adjustment of the positioning of side plates 13 as described in FIG. 9.

In interest of economy, the bolt 33 is made from the appropriate length of ¼–28 N.F. all-thread with two ¼–28 N.F. hex nuts 51 jammed together at one end to serve as bolt head 37. A flat washer 36 under the hex nut 51 prevents the galling and collapse of the wood of the side plates 13 where the bolt 33 enters holes 34. Recesses 35 prevent the bolt head 37 of bolts 33 from interfering with cover 23. The bolts 33 of connection 14 are tightened and loosened with a mating size nut driver 52 which is stored under cover 23 when the cradle 10 is not being used. When a bolt 33 is tightened, nut plate 32 is raised upward against clamp surface 44, and drawing the side down tightly against the top of the base plate 12.

The method of joining the end panels 24 to the top panel 27 of the cover 23 is shown in FIG. 8. The components are glued together with a suitable wood glue and reinforced with two wooden gussets 53 of triangular cross-section, one for each end panel 24. Gussets 53 run the width of top panel 27 but are shorter than the width top panel 27 to provide clearance for side plates 13 when cover 23 is installed.

When side plates 13 and side cushion 16 are positioned to best grip the engine 11, or car, each end may be positioned to best suit the gripping requirements. FIG. 9 shows side plates 13 adjusted to a narrow dimension A at one end and wider dimension B at the opposite end to best fit to the sides 41 of engine 11.

A typical Garden Scale engine may be about 4 to 5 inches wide at the widest parts, so the interior work space defined by side plates 13 should preferably be about (on average) 6 to 7 inches wide, about 6 inches high, and about 2 feet long; and applying those preferred dimensions to the drawings will help in the teaching of the preferred dimension of the preferred embodiment of this invention, as shown in the drawings.

As a method, the cradle system of the present invention, as described herein, includes the steps of: providing a first flat rectangular plywood sheet (element 45, see FIGS. 6 and 7) having a pair of ends and an upper surface (as shown); providing four identical rectangular metal nuts 32 and four corresponding fitting identical bolts 33 each about 6 inches long; near each such end (of this first plywood sheet, as shown in the drawings), cutting a large transverse notch 43 into such upper surface, such large transverse notch being about 1/16 inch wider than the width of a such nut and 1/16 inch deeper than the height of a such nut; providing a second flat rectangular plywood sheet 46 having a lower surface 44 and having the same length and width as such first flat rectangular plywood sheet; superimposing and adhesively fixing such lower surface 44 of such second plywood sheet upon the upper surface of the first plywood sheet (see FIG. 6); centered on each such large transverse notch 43, cutting a small transverse notch 42 through the second plywood sheet, the width of notch 42 being about 1/16 inch more than the diameter of a bolt 33; providing a pair of third flat rectangular plywood sheets 13; aligning each third plywood sheet 13 vertically atop a corresponding longitudinal edge of the second plywood sheet 46; in each third plywood sheet, drilling a pair of vertical bolt-holes 34, each vertical bolt-hole 34 being centered on a small transverse notch 42; placing a pair of nuts 32 in each large transverse notch 43, a nut 32 under each vertical bolt-hole 34; in each third plywood sheet 13, cutting a top notch 35, through such third plywood sheet, large enough to permit a bolt-head manipulation from above (see FIG. 7); placing a bolt 33 in each bolt-hole 34 and loosely affixing each bolt 33 in each corresponding nut 32; by sliding the third plywood sheets 13 along second plywood sheet 46 (see drawings, esp. FIG. 9), cradling a model train rolling stock piece 11, of about Garden Scale, within cushioning members (like elements 15, 16, and 17), until such piece 11 is safely snug enough for repair; and tightening each bolt 33 in each corresponding nut 32 for secure cradling.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A portable cradle system for use in repairing model train rolling stock, comprising, in combination:

a. longitudinal base plate means having a horizontal upper surface and a pair of end vertical transverse surfaces, said base plate means comprising
   i. a transverse upside-down T-slot in said upper surface, said T-slot having an upper portion narrower than a bottom portion of said T-slot;

b. longitudinal vertical side plate means abutting said upper surface of said base plate means and having upper edges, said side plate means defining an interior work space and comprising
   i. a vertical hole aligned with a said T-slot;

c. connection means for releasably connecting said base plate means with said side plate means, said connection means comprising
   i. bolt means passing through said vertical hole,
   ii. nut means situate in said T-slot,
   iii. said bolt means being tightenable in said nut means, whereby said side plate means may be immovably connected with said base plate means;

d. wherein said bolt means comprises bolt-head means, below a level of said upper edges, for tightening and loosening said bolt means from above; and e. wherein said side plate means comprises notch means, along said upper edges and in line with said vertical hole, for permitting said bolt-head means to be tightened and loosened from above.

2. A portable cradle system according to claim 1 wherein:

a. said nut means is generally rectangular and is sized small enough to permit movement through a said bottom portion of a said T-slot; and b. said cradle system further comprises a cushioning means in said interior work space and abutting said side plate means.

3. A portable cradle system according to claim 2, for use with model trains of about Garden Scale size, wherein said interior work space is about (on average) 6 to 7 inches wide, about 6 inches high, and about 2 feet long.

4. A portable cradle system according to claim 3 further comprising:

a. cradled in said interior work space in said cushioning means, a piece of model train rolling stock.

* * * * *